(12) United States Patent
Disch et al.

(10) Patent No.: US 11,821,351 B2
(45) Date of Patent: Nov. 21, 2023

(54) METHOD FOR OPERATING AN EXHAUST GAS BURNER DURING ITS START PHASE

(71) Applicant: Robert Bosch GmbH, Stuttgart (DE)

(72) Inventors: Christian Disch, Wimsheim (DE); Dietmar Uhlenbrock, Stuttgart (DE); Max Braunbeck, Lauffen Am Neckar (DE); William Krein, Neckarzimmern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/854,831

(22) Filed: Jun. 30, 2022

(65) Prior Publication Data
US 2023/0003157 A1  Jan. 5, 2023

(30) Foreign Application Priority Data
Jul. 5, 2021  (DE) .................... 10 2021 207 026.4

(51) Int. Cl.
*F01N 3/20* (2006.01)
*F01N 3/22* (2006.01)
*F01N 3/025* (2006.01)

(52) U.S. Cl.
CPC .......... *F01N 3/2033* (2013.01); *F01N 3/025* (2013.01); *F01N 3/22* (2013.01); *F01N 3/225* (2013.01); *F01N 2240/14* (2013.01); *F01N 2430/06* (2013.01); *F01N 2550/14* (2013.01); *F01N 2610/03* (2013.01); *Y02T 10/12* (2013.01)

(58) Field of Classification Search
CPC ......... F01N 3/025–0256; F01N 3/2033; F01N 2240/14; F01N 2610/03; F01N 3/22–227
See application file for complete search history.

(56) References Cited

U.S. PATENT DOCUMENTS

| | | | |
|---|---|---|---|
| 6,318,077 B1 * | 11/2001 | Claypole | F01N 3/2006 60/303 |
| 11,506,136 B1 * | 11/2022 | Harris | F01N 3/2066 |
| 2008/0110157 A1 * | 5/2008 | Winter | F01N 9/002 60/286 |
| 2020/0102874 A1 * | 4/2020 | Kurtz | F02D 41/1441 |
| 2022/0290596 A1 * | 9/2022 | Fried | F01N 9/00 |
| 2022/0307401 A1 * | 9/2022 | Uhlenbrock | B01D 53/9454 |

FOREIGN PATENT DOCUMENTS

| | | | |
|---|---|---|---|
| DE | 3532778 A1 * | 3/1983 | |
| DE | 4132814 A1 | 4/1993 | |
| DE | 19504208 A1 | 8/1995 | |
| EP | 0752558 A2 * | 1/1997 | |

* cited by examiner

*Primary Examiner* — Laert Dounis
(74) *Attorney, Agent, or Firm* — NORTON ROSE FULBRIGHT US LLP; Gerard Messina

(57) ABSTRACT

A method for operating an exhaust gas burner that is situated in an exhaust gas system downstream from an internal combustion engine of a motor vehicle during a start phase of the exhaust gas burner, in which the internal combustion engine is not fired. The method includes an incremental increasing of the air mass flow supplied to the exhaust gas burner and an incremental varying of a fuel mass flow supplied to the exhaust gas burner.

9 Claims, 6 Drawing Sheets

METHOD FOR OPERATING AN EXHAUST GAS BURNER DURING ITS START PHASE

FIELD

The present invention relates to a method for operating an exhaust gas burner during its start phase as well as a processing unit and a computer program for carrying out same.

BACKGROUND INFORMATION

To comply with the statutory emission limiting values, three-way catalytic (TWC) converters, which enable a conversion of the relevant gaseous pollutants NOR, HC, and CO into harmless products, such as $N_2$, $H_2O$, and $CO_2$, may be used. For these catalytic reactions to be able to take place according to their intended purposes, the temperatures in the catalytic converter must usually exceed the so-called light-off temperature of typically 300° C. to 400° C. As soon as same is reached or exceeded the catalytic converter converts the relevant pollutants almost completely (so-called catalytic converter window).

In order to reach this state as soon as possible, so-called internal engine catalytic converter heating measures may be applied. In this case, the efficiency of the gasoline engine is degraded due to late ignition angles and the exhaust gas temperature and the enthalpy input into the catalytic converter are increased. As a result of the adapted injection strategies (for example multiple injections), the combustion stability may be ensured at the same time.

In addition to these internal engine catalytic converter heating measures, external catalytic converter heating measures may also be used, for example with the aid of electrically heatable catalytic converters or exhaust gas burners. External heating measures of this type are described in German Patent No. DE 41 32 814 A1 and German Patent Application No. DE 195 04 208 A1, for example.

To further reduce emissions as compared to a conventional operation using internal engine heating measures, in particular in the case of cold starts, i.e., high stresses of the internal combustion engine in the cold state without idling period, so-called catalytic converter burners have proven themselves to be an extremely effective measure to accelerate the TWC light off.

SUMMARY

According to the present invention, a method for operating an exhaust gas burner during its start phase as well as a processing unit and a computer program, for carrying out same method are provided. Advantageous embodiments of the present invention are disclosed herein.

A method according to an example embodiment of the present invention for operating an exhaust gas burner that is situated in an exhaust gas system downstream from an internal combustion engine of a motor vehicle during a start phase of the exhaust gas burner, in which the internal combustion engine is not fired, includes an incremental increasing in the air mass flow supplied to the exhaust gas burner and an incremental varying of a fuel mass flow supplied to the exhaust gas burner.

The method according to the present invention as well as its advantageous embodiments, which are described below in detail, enable a reliable start of the exhaust gas burner on the one hand and a performance- and emission-optimized operation following a successful start on the other hand. At the beginning of the burner operation, a sufficient air supply must initially be ensured that may be necessary for a combustion start on the one hand and for the protection of an ignition system of the exhaust gas burner (for example of a spark plug prior to the spark gap shift using fuel drops) on the other hand. At the beginning, the air mass flow should, however, also be such that the fuel supplied into the combustion chamber has sufficient contact time in the hot zone of the ignition system to be heated above its ignition temperature. If the air mass flow is too high, it is not ensured that the fuel is ignited or it is possible that a flame that has already formed is quenched or blown out in the case of a combustion chamber that is still cold.

It is to be explicitly pointed out in this case that during the start phase of the exhaust gas burner, the same is usually still cold, so that a control based on exhaust gas compositions (with the aid of a lambda sensor) is not possible, for example, since the necessary sensors must first be heated to their operating temperatures. In view of the increasingly stringent exhaust gas limiting values that are to be complied with as reliably as possible during the burner operation the necessity results for an optimal start of the burner independently of measurements that are a function of the temperature. This is enabled with the aid of the incremental method described here.

In particular, the incremental increasing of the air mass flow includes an increasing of the air mass flow during a start time period to a first air mass flow value, a supplying of a constant air mass flow having the first air mass flow value to the exhaust gas burner during a holding time period, which chronologically follows the start time period, an increasing of the air mass flow during an intensifying time period, which chronologically follows the holding time period, to a second air mass flow value, and a supplying of a constant air mass flow having the second air mass flow value to the exhaust gas burner during a heating time period, which follows the intensifying time period.

The incremental varying of the fuel mass flow advantageously includes a setting of a first fuel mass flow during a first metering time period and a setting of at least one second fuel mass flow during at least one second metering time period, the at least one second metering time period chronologically following the first metering time period. In particular, the first metering time period may chronologically at least in part follow the start time period and/or be established as a function of the temporal position of the start time period and/or holding time period. The fuel may be introduced into the exhaust gas burner intermittently and/or continuously, for example with the aid of an injector or a nozzle connected to a pressure reservoir.

Similarly to the air mass flow, the fuel mass flow also has an important influence on the reliability of a flame formation as well as on the flame stability. For this reason, at the beginning of the burner operation a fuel mass flow is set that is adapted for an optimal ignition, whereas after the successful ignition (or a time period provided therefor) the fuel mass flow is preferably optimized with regard to burner performance and emission behavior. Since air, as a compressible medium, may be subject to relatively strong fluctuations with regard to fluid dynamics, a stability of the air mass flow is preferably desirable prior to the fuel being introduced into the exhaust gas burner to ensure the desired optimized operating conditions.

In advantageous example embodiments of the present invention, the method further includes an incremental varying of an ignition energy supplied to the exhaust gas burner, the incremental varying of the ignition energy in particular including consecutively setting a first ignition frequency and at least one second ignition frequency, the first and the at least one second ignition frequencies being different from one another. The ignition is a further crucial factor for ensuring a combustion start as well as for minimizing efficiency losses and emissions. An adaptation of the ignition frequency is therefore advantageous as a function of the particular operating point. For example, at the beginning of the start phase of the exhaust gas burner, a low ignition frequency (and thus, in the case of a conventional coil ignition, long charging times and long spark burn times) may be implemented to achieve a strong heating up in the immediate surroundings of the ignition system. This may support a reliable flame formation.

The setting of the first and/or the at least one second ignition frequency may take place in particular as a function of one or more from the group of air mass flow and fuel mass flow during the start time period, the holding time period, the intensifying time period, the heating time period, the first metering time period and the at least one second metering time period. An adaptation to the remaining operating variables of the exhaust gas burner may further have a positive effect on ignition reliability and/or flame stability.

According to an example embodiment of the present invention, alternatively or in addition to such an intermittent ignition (for example with the aid of coil ignition), ignition energy may be introduced at least in part continuously into the exhaust gas burner, for example with the aid of hot surfaces such as a glow plug or a glow filament. A continuously working ignition system may certainly be operated in a not frequency modulated manner, as described above. However, in such a case a variation of the ignition energy, for example by varying the temperature of the hot surface, may also potentially take place. A combination of continuous and intermittent ignition may also be advantageous in specific cases, for example continuous for heating up the combustion chamber, intermittent for precisely controlling the combustion after the combustion start.

According to an example embodiment of the present invention, the method preferably includes a setting of the air mass flow and/or fuel mass flow and/or ignition energy as a function of one or more operating parameters of the motor vehicle, in particular selected from the group of an outdoor temperature, an air pressure (for example ambient pressure, secondary air pressure), a relative air humidity, a temperature of the exhaust gas burner, a fuel pressure, a fuel quality, an electrical voltage (for example of a vehicle battery), a throttle valve setting, an exhaust gas mixture requirement, an exhaust gas composition, and a pressure and/or a differential pressure within the exhaust gas system. These are particularly relevant parameters that considerably influence or characterize flame formation and flame stability as well as the emission behavior of the exhaust gas burner, so that their incorporation into the burner control may result in an advantage with regard to operational reliability and efficiency.

A processing unit according to the present invention, e.g., a control unit of a motor vehicle, is designed, in particular from a programming point of view, to carry out a method according to the present invention.

According to an example embodiment, it is also advantageous to implement the method according to the present invention in the form of a computer program or computer program product having program code for the purpose of carrying out all method steps, since this is particularly cost-effective, in particular when an executing control unit is also used for other tasks and is thus present anyway. Finally, a machine-readable memory medium is provided including a computer program stored on it as described above. Suitable memory media or data media for providing the computer program are, in particular, magnetic, optical, and electric memories such as hard drives, flash memories, EEPROMs, DVDs, and many others. It is also possible to download a program via computer networks (Internet, Intranet, etc.). Such a download may take place in a wired or wireless manner (for example via a WLAN network, a 3G, 4G, 5G or 6G connection, etc.).

Further advantages and embodiments of the present invention result from the description and the figures.

The present invention is schematically illustrated in the figures on the basis of exemplary embodiments and described in the following with reference to the figures.

DETAILED DESCRIPTION OF EXAMPLE EMBODIMENTS

Figure 1:
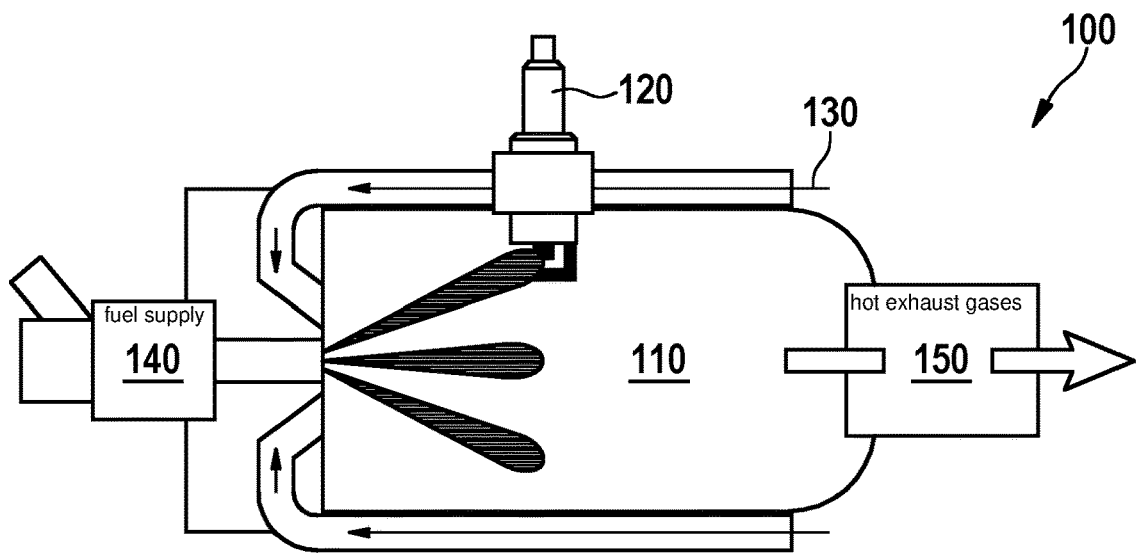
FIG. 1 shows a schematic illustration of an exhaust gas burner such as the one that may be used within the scope of the present invention.

In FIG. 1, an exhaust gas burner, with the aid of which a method according to the present invention may be carried out, is schematically illustrated and denoted overall with reference numeral 100. Exhaust gas burner 100 includes a combustion chamber 110, an ignition system 120, here in the form of a spark plug, which may be energized, for example, with the aid of an ignition coil, an air supply 130, which may be supplied by a secondary air pump, and a fuel supply 140, here in the form of an injection system. During the operation of exhaust gas burner 100, the fuel that is introduced into combustion chamber 110 is subjected together with the introduced air to a reaction using ignition system 120, hot exhaust gases 150 being formed that are used to heat up the components, which are situated downstream from the exhaust gas burner, of an exhaust gas system of an internal combustion engine, for example catalytic converters, particle filters, lambda sensors, or the like. An essential feature of this design is the direct injection of the fuel into combustion chamber 110 and the interaction with ignition system 120 associated therewith, the present invention not being limited to this construction principle.

Figure 13:
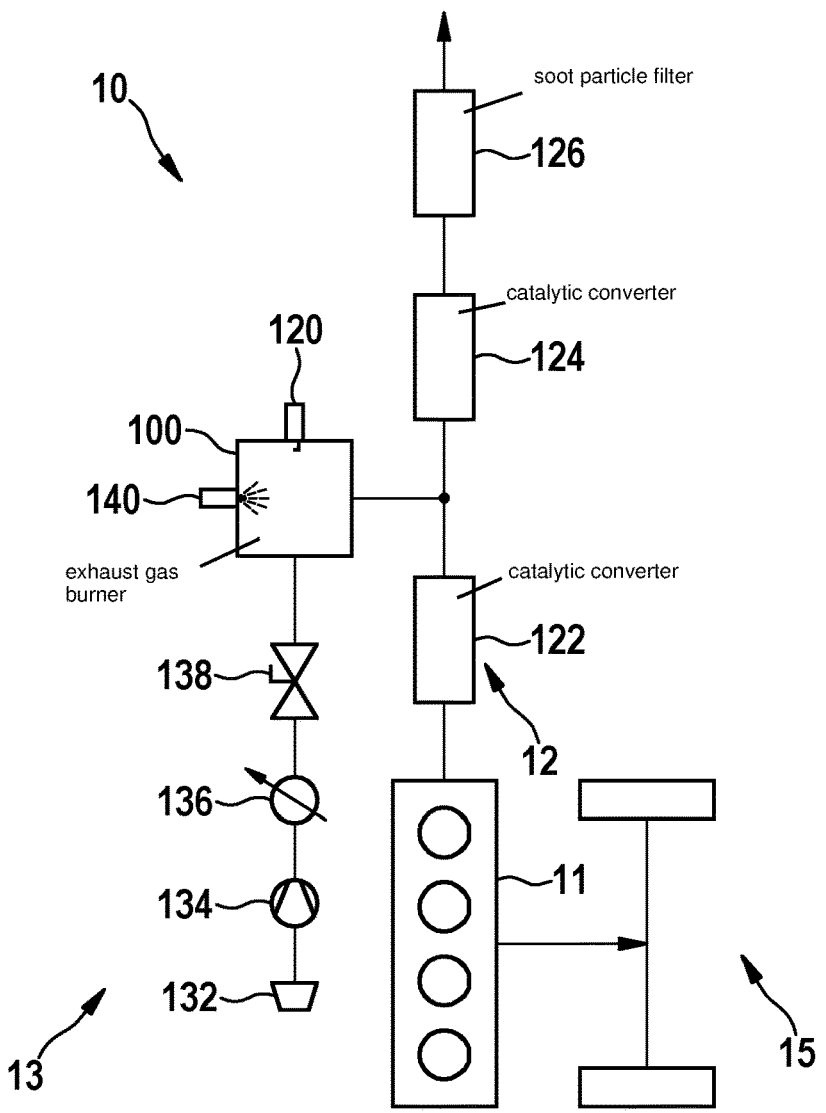
FIG. 13 schematically shows a vehicle, in which the advantageous embodiments of a method according to the present invention may be applied.

In FIG. 13, a vehicle such as the one that may be used within the scope of the present invention is schematically illustrated and denoted overall with reference numeral 10. In the example shown, vehicle 10 includes an internal combustion engine 11, for example a piston engine or a rotary engine with spark ignition, an exhaust gas system 12 that is configured for after-treatment of an exhaust gas generated by internal combustion engine 11 and for this purpose for example includes catalytic converters 122, 124 and soot particle filter 126, an exhaust gas burner, for example exhaust gas burner 100 illustrated in FIG. 1, for heating at least a part of exhaust gas system 12, and a secondary air system 13 that is configured to supply exhaust gas system 12 and/or exhaust gas burner 100 with air to enable or enhance oxidation reactions.

Secondary air system 13 includes in this case an air filter 132, an air pump 134, a sensor 136, for example a pressure and/or temperature sensor, and a secondary air valve 138 that may be provided in the form of a blocking valve and may stop or allow air supply 130 from secondary air system 13 into exhaust gas burner 100 or exhaust gas system 12.

It is understood that the components of vehicle 10 described here do not necessarily have to be situated with regard to one another in the order illustrated here. For example, sensor 136 may also be situated downstream from valve 138 or particle filter 126 upstream from catalytic converter 124. It may furthermore be advantageous to provide further components or connections between secondary air system 13 and exhaust gas system 12 at other locations. Instead of a pressure sensor 136 or in addition thereto, a differential pressure sensor may also be provided via air pump 134 and/or via secondary air valve 138.

Figure 2:
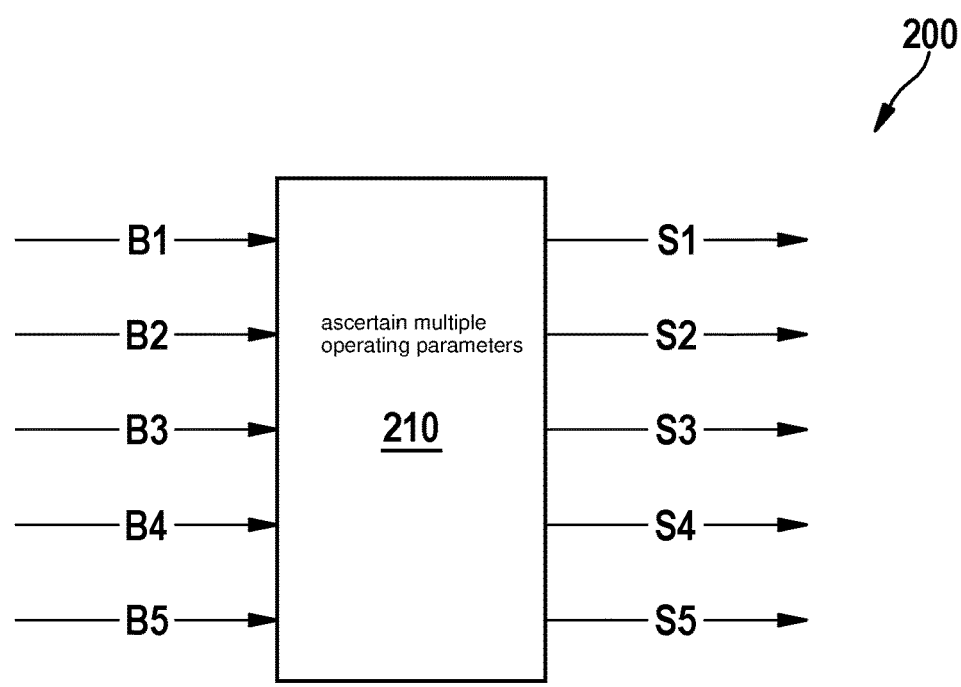
FIG. 2 shows a heavily simplified illustration of an advantageous embodiment of a method according to the present invention.

In FIG. 2, an advantageous embodiment of a method according to the present invention is illustrated in a heavily simplified manner in the form of a block diagram and is denoted overall by reference number 200.

Method 200 ascertains, based on multiple operating parameters B1, B2, B3, B4, B5 of internal combustion engine 11, exhaust gas system 12, exhaust gas burner 100 and/or vehicle 10, whose wheels 15 are driven at least in part using internal combustion engine 11, one or multiple control variables S1, S2, S3, S4, S5 for the purpose of operating exhaust gas burner 100.

For example, used operating parameters B1 through B5 may involve an outdoor temperature, an ambient air pressure or a barometric height, a relative air humidity, a lambda value, a fuel pressure, a fuel quality, a throttle valve position, a rotational speed, a voltage (for example of a vehicle battery), a pressure or a differential pressure within the exhaust gas system and/or an empirical value that was ascertained on the basis of previous operating phases of exhaust gas burner 100.

The control variables may in particular include points in time and/or time periods for method steps, manipulated variables such as air mass flows, fuel mass flows, ignition timings, ignition voltages, ignition currents, fuel pressures, air/fuel ratios, injection frequencies and/or relative temporal shifts of ignition time and injection time.

Based on the ascertained control variables, the operation of the exhaust gas burner, here in particular in its start phase, is subsequently controlled.

Figure 3:
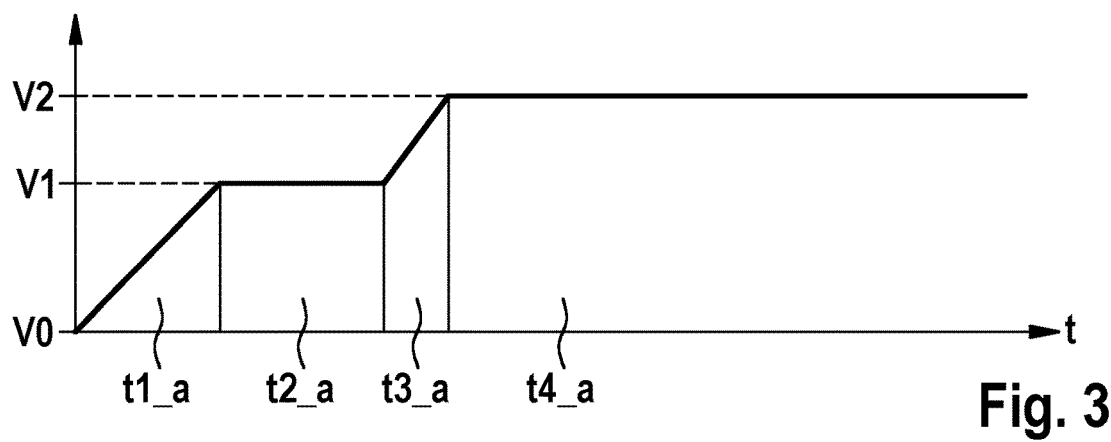
FIG. 3 shows a simplified exemplary profile of an air mass flow such as may occur within the scope of the present invention.

In FIG. 3, an exemplary profile of an air mass flow, such as the one that may be set within the scope of method 200 described with reference to FIG. 2, is schematically illustrated. During a start time period t1_a, at the beginning of which a start intention (with regard to the internal combustion engine) is already present, air supply 130 is activated and an air mass flow is increased to a first air mass flow value V1 (starting from an air mass flow value V0 that may be zero, for example, or may result from the fluid mechanics in the case of a not activated air supply 130). At the end of time period t1_a the air mass flow value of V1>V0 is reached. This air mass flow [value] V1 is then essentially kept constant over a holding time period t2_a. During an intensifying time period t3_a following the holding time period, the air mass flow is increased to a value V2>V1 and subsequently essentially kept constant over a heating time period t4_a. Time periods t1_a through t4_a describe in particular the time period for the start procedure or the start phase of exhaust gas burner 100 and not its entire operating time. For example, the start phase may be such that the internal combustion engine is started at the end of heating time period t4_a. At this point in time, the exhaust gas system is preferably thermally already in a state ready for operation, so that no noticeable pollutant emissions are to be expected with the start of the internal combustion engine.

Figure 4:
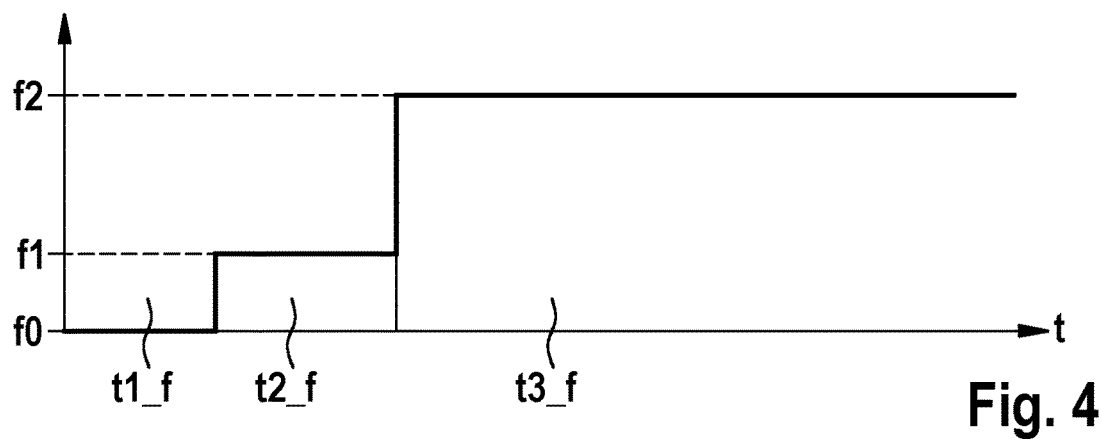
FIG. 4 shows a simplified exemplary profile of a fuel mass flow such as may occur within the scope of the present invention.
Figure 5:
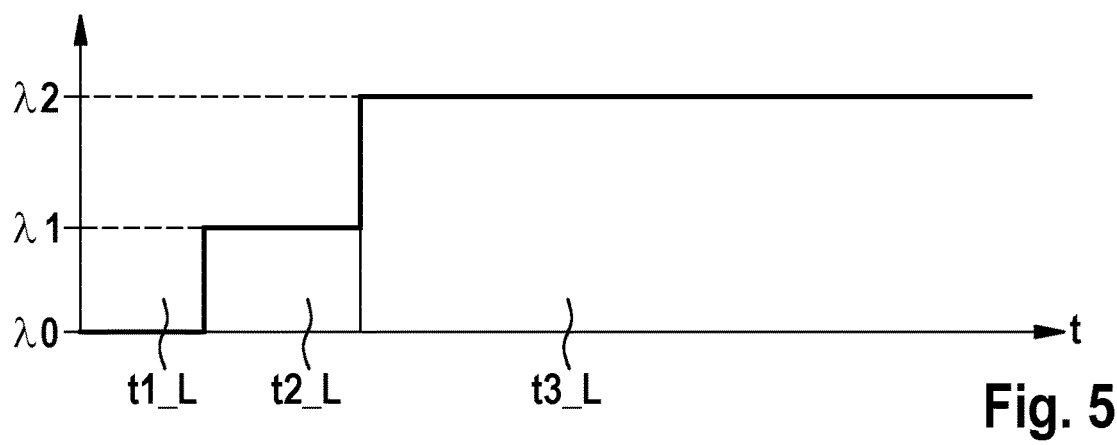
FIG. 5 shows a simplified exemplary profile of a predefined air/fuel ratio such as may occur within the scope of the present invention.

In FIGS. 4 and 5, exemplary profiles of a fuel mass flow or an air/fuel ratio are illustrated in a simplified manner. In particular, a fuel mass flow may be adapted to fuel supply 140 by varying the injection frequency. In the example illustrated here, three control time periods t1_f, t2_f and t3_f having fuel mass flows f0, f1, f2 or t1_L, t2_L, and t3_L having air/fuel ratios λ0, λ1, λ2, which are to be differentiated from one another, are apparent in each case, which may essentially correspond to time periods t1_a, t2_a and t4_a from FIG. 3. Intensifying time period t3_a in FIG. 3 results from the compressibility of air and thus an inertia of air supply 130. In contrast, fuel supply 140 may be activated very quickly and responds practically without delay. It is, however, to be noted in this case that the illustrated profiles in FIGS. 4 and 5 are not necessarily profiles that would be obtained within the scope of the same control. In particular, an essentially constant profile of the air/fuel ratio would result from the combination of the air mass profile from FIG. 3 with the fuel mass profile from FIG. 4. Initial value λ0 illustrated in FIG. 5 is not relevant, since at that point in time no fuel has been injected yet and thus a ratio of air to fuel cannot be computed.

Figure 6:
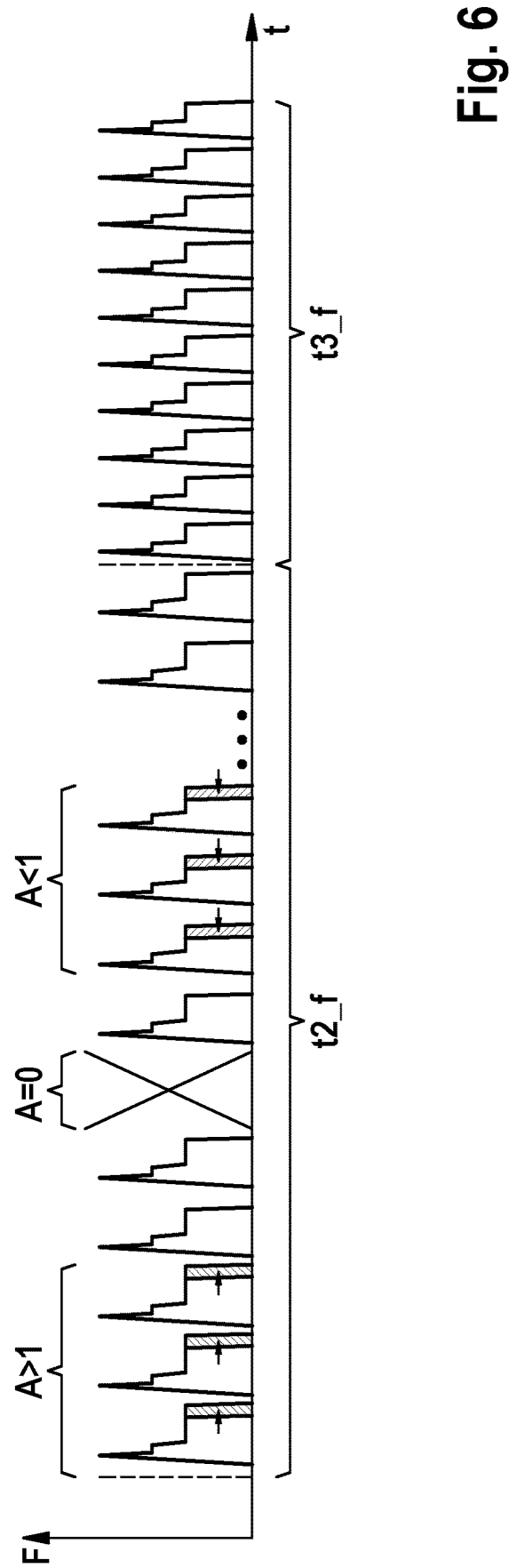
FIG. 6 shows a simplified exemplary profile of fuel injections such as may occur within the scope of the present invention.

In FIG. 6, it is illustrated in greater detail how a variation of the fuel mass flow may be implemented using direct injection, an activation signal F (for example activation voltage) being illustrated over time t. For this purpose, an injection frequency may be adapted in such a way that the required fuel mass flow results on average. For example, in a time period t2_f a low frequency, for example 200 Hz, is set, whereas in a time period t3_f a higher injection frequency, for example 300 Hz, is predefined. As a result, the effective fuel mass flow increases during time period t3_f as compared to time period t2_f. An injection time may be furthermore adapted, for example by using an accumulation factor A, in such a way that the desirable fuel mass flow is set averaged over time. In the example illustrated in FIG. 6, three injection procedures are extended with the aid of an accumulation factor A>1 during time period t2_f, thus resulting in a higher fuel mass flow than without the application of the accumulation factor. In contrast, by using an accumulation factor A<1, a smaller fuel mass flow results, similarly to the case when injections are temporarily stopped (A=0).

A variation of this type may be helpful in particular at the beginning of the fuel injection to stabilize the burner operation, since a not insignificant quantity of fuel is usually deposited on the combustion chamber walls (for example due to adsorption) in the case of a cold combustion chamber 110. This adsorbed fuel quantity is thus not available for combustion. At increasing temperatures, the wall film thus formed is desorbed, so that a higher quantity of fuel than was actually introduced into combustion chamber 110 is available for combustion. To compensate for these effects, it may be advantageous to predefine a higher accumulation factor A (for example A=1.5, which corresponds to a fuel mass flow increase of 50%) at the beginning of the fuel metering (by which the fuel portion withdrawn by the deposition at the combustion chamber walls is replaced), whereas at a later point in time less fuel is advantageously introduced into combustion chamber 110 (A<1) to compensate for the fuel portion that is additionally available as a result of the desorption of the wall film. This form of pilot control is also advantageous, since a possible use of a lambda sensor for ascertaining the air/fuel ratio is potentially not possible due to the lead time for heating up the sensor.

Figure 7:
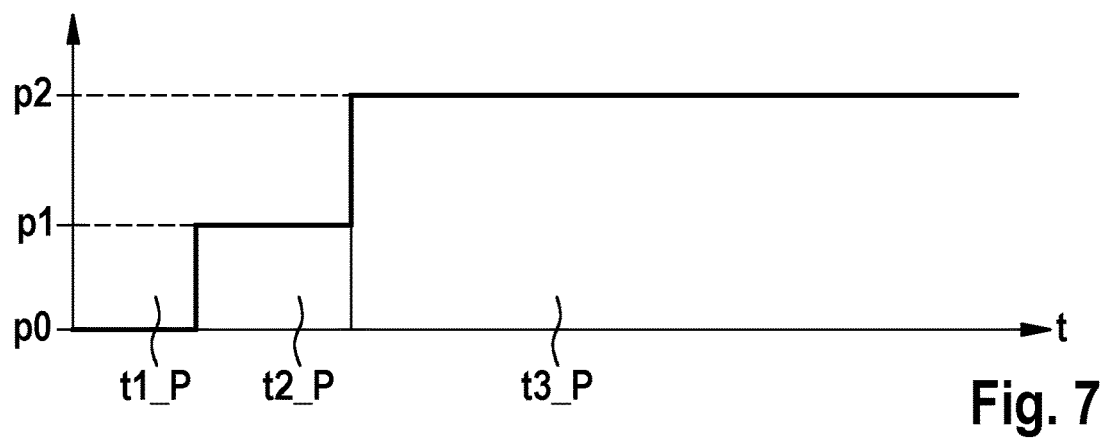
FIG. 7 shows a simplified exemplary profile of a fuel pressure such as may occur within the scope of the present invention.

In general, the fuel mass flow may not only be influenced via an injection frequency modulation, as illustrated in FIG. 4, but also via a variation of injection pressure p, for example a rail pressure. Such a procedure is schematically illustrated in FIG. 7, it being pointed out here as well that a pressure decrease may also take place to obtain an increasing air/fuel ratio. Time periods $t1\_p$, $t2\_p$ and $t3\_p$ having injection pressures p0, p1, p2 may in particular correspond to time periods $t1\_L$, $t2\_L$ or $t3\_L$. In this diagram, too, original value p0 is not relevant, since at this point in time no fuel is injected. The fuel pressure may accordingly be built up slowly over entire time period $t1\_p$ or may only be provided essentially instantaneously at the end of the time period. The specific implementation of the pressure buildup is directed, for example, to the possibilities of a fuel pump that is used for this purpose and that is able to build up pressure very quickly or more slowly depending on the technology used. With regard to a control of the fuel mass flow via fuel pressure the remark with respect to the direction of the variation also applies: increasing fuel pressure goes along with increasing fuel mass flow, so that a combination of the profiles from FIG. 3 (air mass) and FIG. 7 (fuel pressure) would result in an essentially constant profile of the ratio between the air and fuel mass flows (cf. FIG. 5).

Analogously to the above-described procedure, the ignition of the air-fuel mixture introduced into the combustion chamber may in general also be temporally varied, this being contemplated in particular taking into consideration the chronological sequence of the fuel introduction. For example, an ignition frequency may be selected to be identical with the injection frequency elucidated with reference to FIG. 6, so that an ignition takes place at each injection procedure. It is, however, possible for multiple ignitions to take place during each injection procedure, which may have a positive effect on the homogeneity of the combustion, or it is possible for multiple injection procedures to take place during each ignition, since the flame in the combustion chamber may burn longer than the duration of one injection, so that the fuel introduced during a subsequent injection procedure may ignite off of the still burning preceding flame, for example.

In FIGS. 8 through 12 simplified illustrations of exemplary profiles of injection and ignition processes are illustrated relative to one another such as the ones that may occur within the scope of the present invention. An activation signal F (for example activation voltage) for fuel supply 140 and an activating signal Z (for example charging voltage) for ignition system 120 are illustrated over time t.

Figure 8:
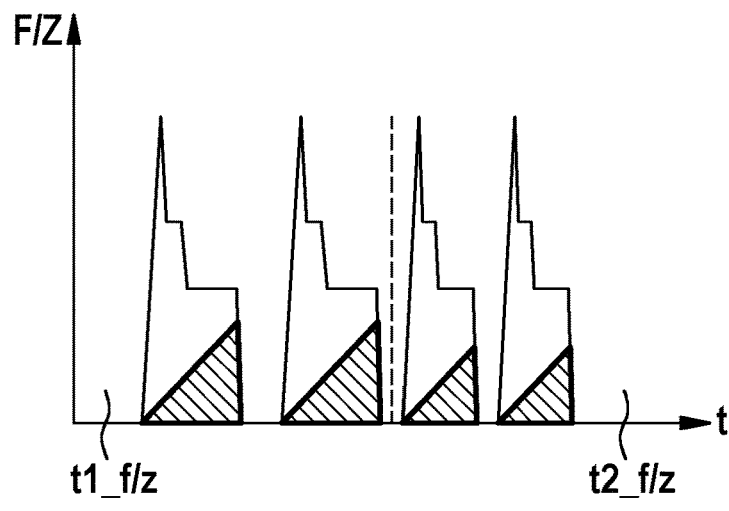
FIGS. 8 through 12 show simplified exemplary profiles of injection and ignition processes relative to one another such as may occur within the scope of the present invention.

In the example illustrated in FIG. 8, the frequency and phase of the injection and ignition procedures are identical, so that at the beginning of the injection the charging of the ignition coil also starts in each case. At the end of the injection procedure, the closing time of the coil charging also ends, so that an ignition spark is generated at the point in time at which the entire injected fuel quantity is already in combustion chamber 110. In the case of an injection frequency change, the frequency of the ignition is also accordingly adapted in the illustrated example, by which at an increased ignition frequency accordingly shorter burning times of the ignition spark result.

Figure 9:
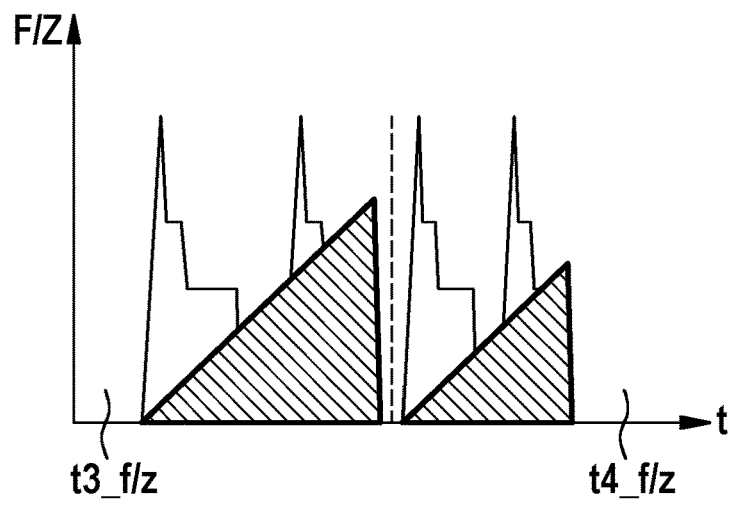

In FIG. 9, a further example of a connection between the injection and the ignition frequency is illustrated, the ignition frequency corresponding in this case to half of the injection frequency, so that an increased spark burning time and thus a more reliable ignition result as compared to the example from FIG. 8. These frequency relationships may also certainly be combined with one another, so that at the beginning of the start phase of the exhaust gas burner, for example, a lower ignition frequency having accordingly longer spark burning times may be set, whereas during a later section of the start phase, a higher ignition frequency, for example to optimize the burner emissions, may be selected.

Figure 10:
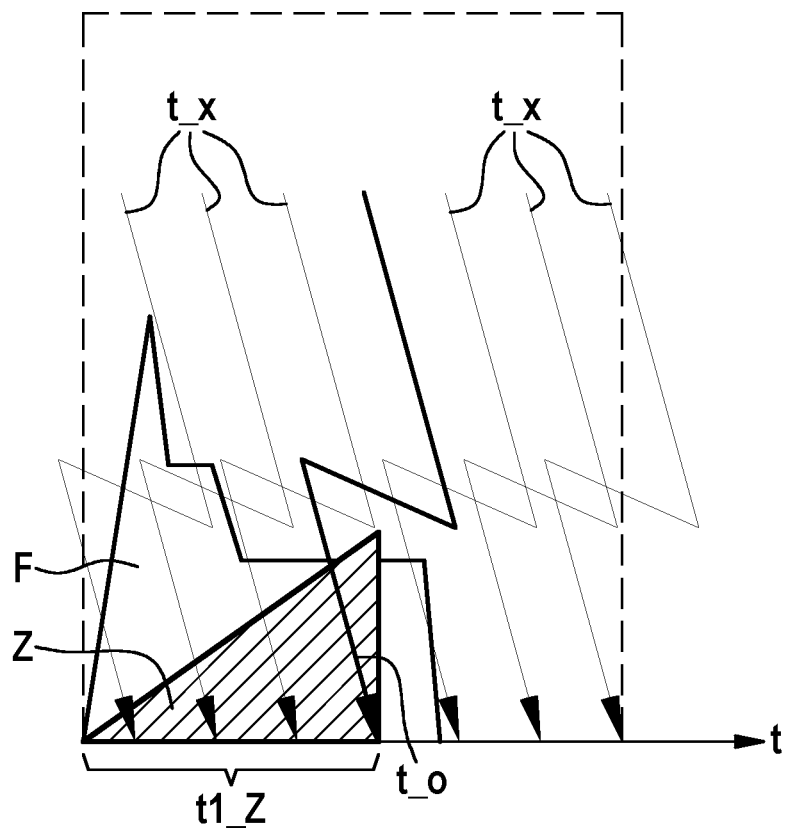

In FIG. 10, possibilities of adapting the specific ignition time are illustrated. By shortening or extending closing time $t1\_Z$, the ignition time may be shifted from an optimal ignition time $t\_o$ to alternative ignition times $t\_x$. The actual position of optimal ignition time $t\_o$ relative to injection F may certainly vary, in particular with regard to an optimization goal (for example flame stability, emission minimization, . . . ) and/or as a function of instantaneous operating parameters of exhaust gas burner 100, such as for example temperature, air/fuel ratio, etc. By shortening closing time $t1\_Z$ the overall charge of the ignition coil and thus energy Z available for the ignition is simultaneously reduced.

Figure 11:
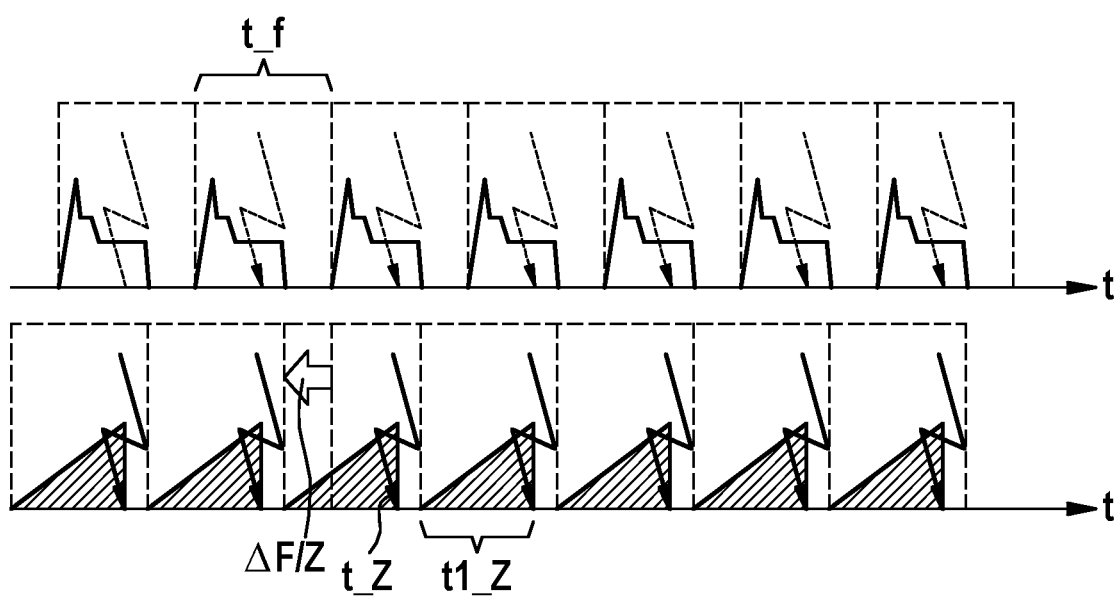

To prevent this energy minimization when shifting the ignition time, a phase shift between ignition Z and fuel injection F, as shown schematically in FIG. 11, come into consideration. Ignition times $t\_Z$ may be shifted by varying phase shift $\Delta F/Z$ relative to injection intervals $t\_F$, so that the energy that is maximally possible within closing time $t1\_Z$ in each case may be made available for the ignition.

Figure 12:
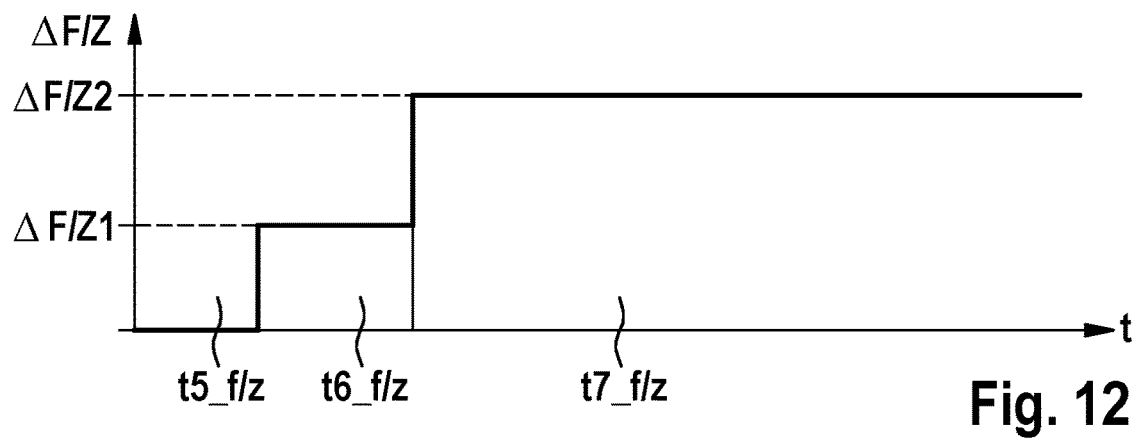

To control the burner operation during the start phase, a variation of this phase shift, such as illustrated in FIG. 12, may also be considered. This may be advantageous to set the optimal ignition times taking into consideration the changing operating conditions within combustion chamber 110. In particular, the temperature in the combustion chamber changes rapidly during holding period $t2\_a$, in which the first combustions take place, so that optimal ignition time $t\_o$ may also significantly change during this time period, so that a relative shift of the ignition and injection may also be advantageous in particular in a similar time window ($t5\_f/z$, $t6\_f/z$, $t7\_f/z$).

It is understood that the above-mentioned time periods do not necessarily need to be exactly congruent, but may correspond to one another only essentially. For example, it may be reasonable to initially stabilize the air mass flow in holding time period $t2\_a$ only for a few milliseconds prior to fuel being injected for the first time ($t2\_f$); this similarly applies to the remaining time periods that essentially correspond to one another.

What is claimed is:

1. A method for operating an exhaust gas burner that is situated in an exhaust gas system downstream from an internal combustion engine of a motor vehicle, the method comprising the following steps:
   during a start phase of the exhaust gas burner, in which the internal combustion engine is not fired, performing:
      incrementally increasing an air mass flow supplied to the exhaust gas burner, and
      incrementally varying a fuel mass flow supplied to the exhaust gas burner;
   wherein the incremental increasing of the air mass flow includes:
      increasing the air mass flow during a start time period to a first air mass flow value;
      supplying a constant air mass flow having the first air mass flow value to the exhaust gas burner during a holding time period, which chronologically follows the start time period;
      increasing the air mass flow during an intensifying time period, which chronologically follows the holding time period, to a second air mass flow value; and
      supplying a constant air mass flow having the second air mass flow value to the exhaust gas burner during a heating time period, which follows the intensifying time period.

2. The method as recited in claim 1, wherein the incremental varying of the fuel mass flow includes:
   setting a first fuel mass flow during a first metering time period; and
   setting at least one second fuel mass flow during at least one second metering time period, the at least one second metering time period chronologically following the first metering time period.

3. The method as recited in claim 2, wherein the first metering time period: (i) chronologically at least in part follows the start time period, and/or (ii) is established as a function of a temporal position of the start time period and/or the holding time period.

4. The method as recited in claim 2, further comprising the following step:
   incrementally varying an ignition energy supplied to the exhaust gas burner, the incremental varying of the ignition energy including consecutively setting a first ignition frequency and at least one second ignition frequency, the first and the at least one second ignition frequencies being different from one another.

5. The method as recited in claim 4, further comprising the following step:
   setting the first and/or the at least one second ignition frequency as a function of one or more from a group of: air mass flow and fuel mass flow during the start time period, the holding time period, the intensifying time period, the heating time period, the first metering time period and the at least one second metering time period.

6. The method as recited in claim 1, wherein an ignition energy is introduced at least in part continuously into the exhaust gas burner.

7. The method as recited in claim 6, further comprising:
   setting of the air mass flow and/or fuel mass flow and/or ignition energy as a function of one or more operating parameters of the motor vehicle, the one or more operating parameters being selected from the group of: an outdoor temperature, an air pressure, a relative air humidity, a temperature of the exhaust gas burner, a fuel pressure, a fuel quality, a voltage, a throttle valve setting, an exhaust gas mixture requirement, an exhaust gas composition, and a pressure and/or a differential pressure within the exhaust gas system.

8. A processing unit configured to operate an exhaust gas burner that is situated in an exhaust gas system downstream from an internal combustion engine of a motor vehicle, the processing unit configured to:
   during a start phase of the exhaust gas burner, in which the internal combustion engine is not fired, perform:
      an incremental increasing of an air mass flow supplied to the exhaust gas burner, and
      an incremental varying of a fuel mass flow supplied to the exhaust gas burner;
   wherein the incremental increasing of the air mass flow includes:
      increasing the air mass flow during a start time period to a first air mass flow value;
      supplying a constant air mass flow having the first air mass flow value to the exhaust gas burner during a holding time period, which chronologically follows the start time period;
      increasing the air mass flow during an intensifying time period, which chronologically follows the holding time period, to a second air mass flow value; and
      supplying a constant air mass flow having the second air mass flow value to the exhaust gas burner during a heating time period, which follows the intensifying time period.

9. A non-transitory machine-readable memory medium on which is stored a computer program for operating an exhaust gas burner that is situated in an exhaust gas system downstream from an internal combustion engine of a motor vehicle, the computer program, when executed by a computer, causing the computer to perform the following steps:
   during a start phase of the exhaust gas burner, in which the internal combustion engine is not fired, performing:
      incrementally increasing an air mass flow supplied to the exhaust gas burner, and
      incrementally varying a fuel mass flow supplied to the exhaust gas burner;
   wherein the incremental increasing of the air mass flow includes:
      increasing the air mass flow during a start time period to a first air mass flow value;
      supplying a constant air mass flow having the first air mass flow value to the exhaust gas burner during a holding time period, which chronologically follows the start time period;
      increasing the air mass flow during an intensifying time period, which chronologically follows the holding time period, to a second air mass flow value; and
      supplying a constant air mass flow having the second air mass flow value to the exhaust gas burner during a heating time period, which follows the intensifying time period.

* * * * *